US006983282B2

(12) United States Patent
Stern et al.

(10) Patent No.: US 6,983,282 B2
(45) Date of Patent: Jan. 3, 2006

(54) COMPUTER METHOD AND APPARATUS FOR COLLECTING PEOPLE AND ORGANIZATION INFORMATION FROM WEB SITES

(75) Inventors: Jonathan Stern, Newton, MA (US); Kosmas Karadimitriou, Shrewsbury, MA (US); Jeremy W. Rothman-Shore, Cambridge, MA (US); Michel Decary, Montreal (CA)

(73) Assignee: Zoom Information, Inc., Cambridge, MA (US)

( * ) Notice: Subject to any disclaimer, the term of this patent is extended or adjusted under 35 U.S.C. 154(b) by 857 days.

(21) Appl. No.: 09/821,908

(22) Filed: Mar. 30, 2001

(65) Prior Publication Data

US 2002/0052928 A1 May 2, 2002

Related U.S. Application Data

(60) Provisional application No. 60/221,750, filed on Jul. 31, 2000.

(51) Int. Cl.
*G06F 17/30* (2006.01)

(52) U.S. Cl. .................................................... 707/102

(58) Field of Classification Search .................. 706/45, 706/46, 59, 61; 707/1, 3, 100, 102; 709/201, 709/203, 217, 218, 200
See application file for complete search history.

(56) References Cited

U.S. PATENT DOCUMENTS

| | | | |
|---|---|---|---|
| 5,319,777 | A | 6/1994 | Perez |
| 5,764,906 | A | 6/1998 | Edelstein et al. |
| 5,813,006 | A | 9/1998 | Polnerow et al. |

(Continued)

FOREIGN PATENT DOCUMENTS

| | | |
|---|---|---|
| AU | A-53031/98 | 8/1998 |
| JP | 10-320315 | 12/1998 |
| WO | WO 99/67728 | 12/1999 |
| WO | WO 00/33216 | 6/2000 |

OTHER PUBLICATIONS

Lorrie Faith Cranor and Brian A. LaMacchia, "Spam!" Communications of the ACM, Aug. 1998. vol. 4, No. 8, pp. 74–83.

PCT International Search Report PCT/US01/22425.

A.K. Jain et al. "Data Clustering: A Review." ACM Computing Surveys, vol. 31, No. 3, Sep. 1999, pp. 264–323.

*Primary Examiner*—Robert B. Harrell
(74) *Attorney, Agent, or Firm*—Hamilton, Brook, Smith & Reynolds, P.C.

(57) ABSTRACT

Computer processing method and apparatus for searching and retrieving Web pages to collect people and organization information are disclosed. A Web site of potential interest is accessed. A subset of Web pages from the accessed site are determined for processing. According to types of contents found on a subject Web page, extraction of people and organization information is enabled. Internal links of a Web site are collected and recorded in a links-to-visit table. To avoid duplicate processing of Web sites, unique identifiers or Web site signatures are utilized. Respective time thresholds (time-outs) for processing a Web site and for processing a Web page are employed. A database is maintained for storing indications of domain URLs, names of respective owners of the URLs as identified from the corresponding Web sites, type of each Web site, processing frequencies, dates of last processings, outcomes of last processings, size of each domain and number of data items found in the last processing of each Web site.

25 Claims, 3 Drawing Sheets

U.S. PATENT DOCUMENTS

| | | | | |
|---|---|---|---|---|
| 5,835,905 | A | | 11/1998 | Pirolli et al. |
| 5,895,470 | A | | 4/1999 | Pirolli et al. |
| 5,918,236 | A | | 6/1999 | Wical |
| 5,923,850 | A | | 7/1999 | Barroux |
| 5,924,090 | A | | 7/1999 | Krellenstein |
| 5,974,455 | A | | 10/1999 | Monier ....................... 709/223 |
| 6,065,016 | A | | 5/2000 | Stuntebeck et al. |
| 6,094,653 | A | | 7/2000 | Li et al. |
| 6,112,203 | A | | 8/2000 | Bharat et al. |
| 6,122,647 | A | | 9/2000 | Horowitz et al. |
| 6,128,613 | A | | 10/2000 | Wong et al. |
| 6,212,552 | B1 | | 4/2001 | Biliris et al. |
| 6,253,198 | B1 | | 6/2001 | Perkins |
| 6,260,033 | B1 | | 7/2001 | Tatsuoka |
| 6,266,664 | B1 | | 7/2001 | Russell-Falla et al. |
| 6,269,369 | B1 | | 7/2001 | Robertson |
| 6,301,614 | B1 | * | 10/2001 | Najork et al. .............. 709/223 |
| 6,336,108 | B1 | | 1/2002 | Thiesson et al. |
| 6,336,139 | B1 | | 1/2002 | Feridun et al. |
| 6,349,309 | B1 | | 2/2002 | Aggarwal et al. |
| 6,377,936 | B1 | | 4/2002 | Henrick et al. |
| 6,389,436 | B1 | | 5/2002 | Chakrabarti et al. |
| 6,418,432 | B1 | | 7/2002 | Cohen et al. |
| 6,463,430 | B1 | | 10/2002 | Brady et al. |
| 6,466,940 | B1 | | 10/2002 | Mills |
| 6,493,703 | B1 | | 12/2002 | Knight et al. |
| 6,529,891 | B1 | | 3/2003 | Heckerman |
| 6,553,364 | B1 | | 4/2003 | Wu |
| 6,556,964 | B2 | | 4/2003 | Haug et al. |
| 6,618,717 | B1 | | 9/2003 | Karadimitriou et al. |
| 6,640,224 | B1 | | 10/2003 | Chakrabarti |
| 6,654,768 | B2 | | 11/2003 | Celik |
| 6,668,256 | B1 | | 12/2003 | Lynch |
| 6,675,162 | B1 | | 1/2004 | Russell-Falla et al. |

OTHER PUBLICATIONS

Hall, Robert J. "How to Avoid Unwanted Email." Communications of the ACM, Mar. 1998. vol. 41, No. 3, pp. 88–95.

International Search Report PCT/US01/23343, Mar. 19, 2003, 4 pp.

Guan, T. and K–F Wong, "KPS: a Web information mining algorithm," *Computer Networks 31:11–16* (1495–1507) May 17, 1999, Elsevier Science Publishers B.V., Amsterdam.

Miller, R.C. and K. Bharat, "SPHINX: a framework for creating personal, site specific Web crawlers," *Computer Networks and ISDN Systems, 30:1–7* (119–130) Apr. 4, 1998, North Holland Publishing, Amsterdam.

Powell, T.A. et al., *HTML Programmer's Reference,* (*Appendices A and B*), Osborne/McGraw–Hill, 1998 (pp. 355–377).

PCT International Search Report PCT/US01/41515, Feb. 28, 2003, 4 pp.

Langer, A. and J.S. Rosenschein, "Using Distributed Problem Solving to Search the Web," *Proc. 4th Int. Conf. on Autonomous Agents, ACM, USA*, Jun. 3–7, 2000, pp. 197–198.

PCT International Search Report PCT/US01/22430, Jan. 17, 2003, 4 pp.

PCT International Search Report PCT/US01/22381, Feb. 12, 2003, 3 pp.

PCT International Search Report PCT/US01/24162, Feb. 13, 2003, 4 pp.

Ball, T. and F. Douglis, "An Internet Difference Engine and its Applications, " *Proceedsings of COMPCON '96, IEEE Comp. Soc. Press*, Feb. 25, 1996, p. 71–76.

Freitag, D., "Machine Learning for Information Extraction in Informal Domains," *Machine Learning 39:2/3* (169–202), May/Jun. 2000, p. 169–202.

Kjell, B., "Authorship Attribution of Text Samples Using Neural Networks and Bayesian Classifiers," *IEEE Int. Conf. on Systems, Man, and Cybernetics, vol. 2*, Oct. 5, 1994, pp. 1660–1664.

Singhal, M., "Update Transport: A New Technique for Update Synchronization in Replicated Database Systems, " *IEEE Transactions on Software Engineering 16:12* (1325–1336), Dec. 1, 1990.

ABCNEWS.com, Apr. 28, 1999. http://web.archive.org/web/19990428185649/abcnews.go.com/.

COMPAQ, Apr. 22, 1999. http://web/archive.org/web/19990422222242/www.compaq.com/.

Dwi H. Widyantoro, Thomas R. Ioerger, John Yen. "An Adaptive Algorithm for Learning Changes in User Interests". Nov. 1999. ACM. p. 405–412.

Soumen Chakrabarti, Byron Dom, Piotr Indyk. "Enhanced hypertext categorization using hyperlinks". 1998 ACM. pp. 307–318.

Sahami, M. et al., "SONIA: A Service for Organizing Networked Information Autonomously," *3rd ACM Conference on Digital Libraries, Digital 98 Libraries*, Jun. 23–26, 1998, pp. 200–209.

Nir Friedman, Moises Goldszmidt, "Building Classifiers using Bayesian Networks". From Proceedings of the National Conference on Artificial Intelligence (AAAI96). pp. 1277–1284.

Pazzani, M. et al., "Learning from hotlists and coldlists: Towards a WWW information filtering and seeking agent," *Proc. International Conference on Tools with Artificial Intelligence*, Los Alamitos, CA, 1994, pp. 492–495.

Lam, W. and K. Low, "Automatic Document Classification Based on Probabilistic Reasoning: Model and Performance Analysis," *1996 IEEE Conference on Computational Cybernetics and Simulation*, Orlando, FL 1997, pp. 2719–2723.

PCT International Search Report PCT/US01/22385, Dec. 18, 2002 (4 pp).

Chakrabarti, S. et al., "Focused crawling: a new approach to topic–specific Web resource discovery, " *Proceedings of 8th International World Wide Web Conference*, 1999 (pp. 545–562).

Cho, J. et al., "Efficient Crawling through URL Ordering," *Proceedings of Seventh International Web Conference*, 1998 (20 pp.).

Rennie, J. and A. McCallum, "Using reinforcement learning to spider the Web efficiently," *Proceedings of ICML–99*, 1999 (16 pp.).

McCallam, A. et al., "A Machine Learning Approach to Building Domain–Specific Search Engines," *Proceedings of the Sixteenth International Joint Conference on Artificial Intelligence*, 1999 (6 pp.).

McCallam, A. et al., "Building Domain–Specific Search Engines with Machine Learning Techniques," *Proceedings of AAAI–99 Spring Symposium on Intelligent Agents in Cyberspace*, 1999 (12 pp.).

* cited by examiner

58

TABLE: "Links to Visit"

16

| URL | LINK TEXT |
|---|---|
| http://www.corex.com/index.html | Corex Technologies Corp. |
| http://www.corex.com/about.html | About Corex |
| http://www.corex.com/history.html | Company history |
| http://www.corex.com/products.html | Products > Cardscan Executive |
| http://www.corex.com/news/nov.html | Press Releases > November 1999 |
| http://www.corex.com/news/dec.html | Press Releases > December 1999 |

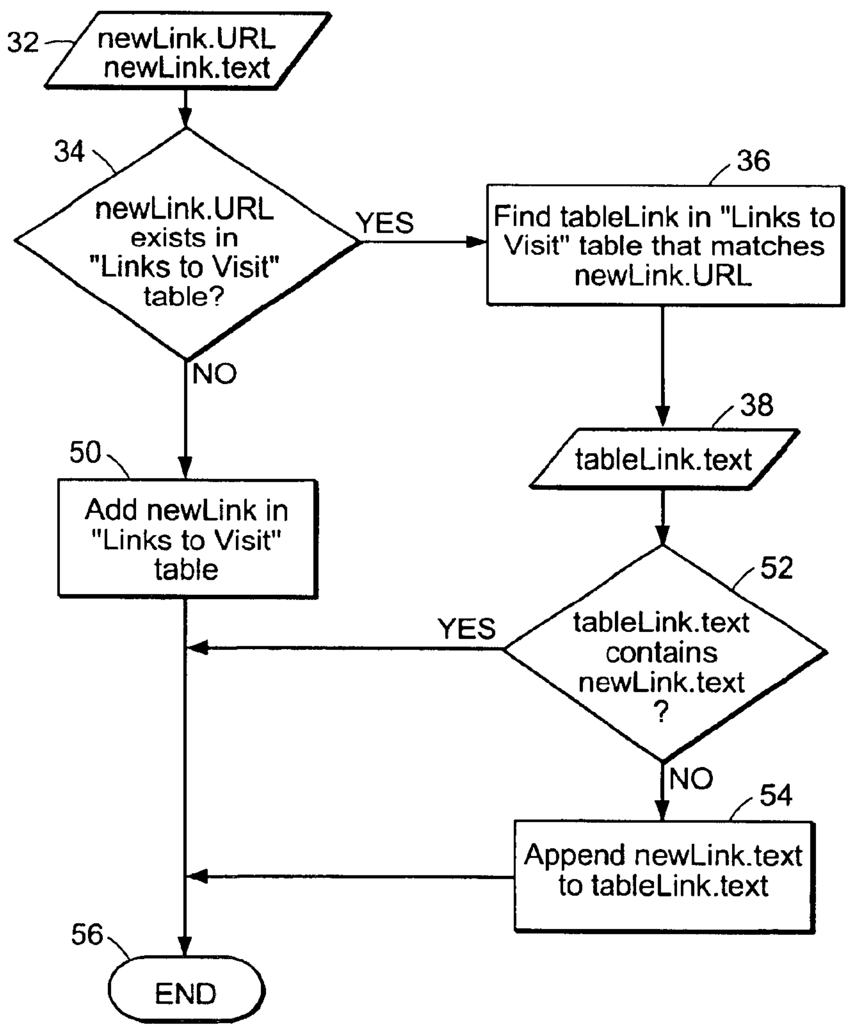

FIG. 3

COMPUTER METHOD AND APPARATUS FOR COLLECTING PEOPLE AND ORGANIZATION INFORMATION FROM WEB SITES

RELATED APPLICATION

This application claims the benefit of U.S. Provisional Application No. 60/221,750 filed on Jul. 31, 2000. The entire teachings of the above application(s) are incorporated herein by reference.

BACKGROUND OF THE INVENTION

Generally speaking a global computer network, e.g., the Internet, is formed of a plurality of computers coupled to a communication line for communicating with each other. Each computer is referred to as a network node. Some nodes serve as information bearing sites while other nodes provide connectivity between end users and the information bearing sites.

The explosive growth of the Internet makes it an essential component of every business, organization and institution strategy, and leads to massive amounts of information being placed in the public domain for people to read and explore. The type of information available ranges from information about companies and their products, services, activities, people and partners, to information about conferences, seminars, and exhibitions, to news sites, to information about universities, schools, colleges, museums and hospitals, to information about government organizations, their purpose, activities and people. The Internet became the venue of choice for every organization for providing pertinent, detailed and timely information about themselves, their cause, services and activities.

The Internet essentially is nothing more than the network infrastructure that connects geographically dispersed computer systems. Every such computer system may contain publicly available (shareable) data that are available to users connected to this network. However, until the early 1990's there was no uniform way or standard conventions for accessing this data. The users had to use a variety of techniques to connect to remote computers (e.g. telnet, ftp, etc) using passwords that were usually site-specific, and they had to know the exact directory and file name that contained the information they were looking for.

The World Wide Web (WWW or simply Web) was created in an effort to simplify and facilitate access to publicly available information from computer systems connected to the Internet. A set of conventions and standards were developed that enabled users to access every Web site (computer system connected to the Web) in the same uniform way, without the need to use special passwords or techniques. In addition, Web browsers became available that let users navigate easily through Web sites by simply clicking hyperlinks (words or sentences connected to some Web resource).

Today the Web contains more than one billion pages that are interconnected with each other and reside in computers all over the world (thus the term "World Wide Web"). The sheer size and explosive growth of the Web has created the need for tools and methods that can automatically search, index, access, extract and recombine information and knowledge that is publicly available from Web resources.

The following definitions are used herein.

Web Domain

Web domain is an Internet address that provides connection to a Web server (a computer system connected to the Internet that allows remote access to some of its contents).

URL

URL stands for Uniform Resource Locator. Generally, URLs have three parts: the first part describes the protocol used to access the content pointed to by the URL, the second contains the directory in which the content is located, and the third contains the file that stores the content:

<protocol>: <domain> <directory> <file> where "protocol" may be the type http, "domain" is a domain name of the directory in which a file so named is located.

Commonly, the <protocol> part may be missing. In that case, modern Web browsers access the URL as if the http:// prefix was used. In addition, the <file> part may be missing. In that case, the convention calls for the file "index.html" to be fetched.

For example, the following are legal variations of URLs:

www.corex.com/bios.html www.cardscan.com fn.cnn.com/archives/may99/pr37.html

Web Page

Web page is the content associated with a URL. In its simplest form, this content is static text, which is stored into a text file indicated by the URL. However, very often the content contains multi-media elements (e.g. images, audio, video, etc) as well as non-static text or other elements (e.g. news tickers, frames, scripts, streaming graphics, etc). Very often, more than one files form a Web page, however, there is only one file that is associated with the URL and which initiates or guides the Web page generation.

Web Browser

Web browser is a software program that allows users to access the content stored in Web sites. Modern Web browsers can also create content "on the fly", according to instructions received from a Web site. This concept is commonly referred to as "dynamic page generation". In addition, browsers can commonly send information back to the Web site, thus enabling two-way communication of the user and the Web site.

Hyperlink

Hyperlink, or simply link, is an element in a Web page that links to another part of the same Web page or to an entirely different Web page. When a Web page is viewed through a Web browser, links on that page can be typically activated by clicking on them, in which case the Web browser opens the page that the link points to. Usually every link has two components, a visual component, which is what the user sees in the browser window, and a hidden component, which is the target URL. The visual component can be text (often colored and underlined) or it can be a graphic (a small image). In the latter case, there is optionally some hidden text associated with the link, which appears on the browser window if the user positions the mouse pointer on the link for more than a few seconds. In this invention, the text associated with a link (hidden or not) will be referred to as "link text", whereas the target URL associated with a link will be referred to as "link URL".

As our society's infrastructure becomes increasingly dependent on computers and information systems, electronic media and computer networks progressively replace traditional means of storing and disseminating information. There are several reasons for this trend, including cost of physical vs. computer storage, relatively easy protection of digital information from natural disasters and wear, almost instantaneous transmission of digital data to multiple recipients, and, perhaps most importantly, unprecedented capabilities for indexing, search and retrieval of digital information with very little human intervention.

Decades of active research in the Computer Science field of Information Retrieval have yielded several algorithms and techniques for efficiently searching and retrieving information from structured databases. However, the world's largest information repository, the Web, contains mostly unstructured information, in the form of Web pages, text documents, or multimedia files. There are no standards on the content, format, or style of information published in the Web, except perhaps, the requirement that it should be understandable by human readers. Therefore the power of structured database queries that can readily connect, combine and filter information to present exactly what the user wants is not available in the Web.

Trying to alleviate this situation, search engines that index millions of Web pages based on keywords have been developed. Some of these search engines have a user-friendly front end that accepts natural languages queries. In general, these queries are analyzed to extract the keywords the user is possibly looking for, and then a simple keyword-based search is performed through the engine's indexes. However, this essentially corresponds to querying one field only in a database and it lacks the multi-field queries that are typical on any database system. The result is that Web queries cannot become very specific; therefore they tend to return thousands of results of which only a few may be relevant. Furthermore, the "results" returned are not specific data, similar to what database queries typically return; instead, they are lists of Web pages, which may or may not contain the requested answer.

In order to leverage the information retrieval power and search sophistication of database systems, the information needs to be structured, so that it can be stored in database format. Since the Web contains mostly unstructured information, methods and techniques are needed to extract data and discover patterns in the Web in order to transform the unstructured information into structured data.

Examples of some well-known search engines today are Yahoo, Excite, Lycos, Northern Light, Alta Vista, Google, etc. Examples of inventions that attempt to extract structured data from the Web are disclosed in sections 5, 6, and 7 of the related U.S. Provisional Application No. 60/221,750 filed on Jul. 31, 2000 for a "Computer Database Method and Apparatus". These two separate groups of applications (search engines and data extractors) have different approaches to the problem of Web information retrieval; however, they both share a common need: they need a tool to "feed" them with pages from the Web so that they can either index those pages, or extract data. This tool is usually an automated program (or, "software robot") that visits and traverses lists of Web sites and is commonly referred to as a "Web crawler". Every search engine or Web data extraction tool uses one or more Web crawlers that are often specialized in finding and returning pages with specific features or content. Furthermore, these software robots are "smart" enough to optimize their traversal of Web sites so that they spend the minimum possible time in a Web site but return the maximum number of relevant Web pages.

The Web is a vast repository of information and data that grows continuously. Information traditionally published in other media (e.g. manuals, brochures, magazines, books, newspapers, etc.) is now increasingly published either exclusively on the Web, or in two versions, one of which is distributed through the Web. In addition, older information and content from traditional media is now routinely transferred into electronic format to be made available in the Web, e.g. old books from libraries, journals from professional associations, etc. As a result, the Web becomes gradually the primary source of information in our society, with other sources (e.g. books, journals, etc) assuming a secondary role.

As the Web becomes the world's largest information repository, many types of public information about people become accessible through the Web. For example, club and association memberships, employment information, even biographical information can be found in organization Web sites, company Web sites, or news Web sites. Furthermore, many individuals create personal Web sites where they publish themselves all kinds of personal information not available from any other source (e.g. resume, hobbies, interests, "personal news", etc).

In addition, people often use public forums to exchange e-mails, participate in discussions, ask questions, or provide answers. E-mail discussions from these forums are routinely stored in archives that are publicly available through the Web; these archives are great sources of information about people's interests, expertise, hobbies, professional affiliations, etc.

Employment and biographical information is an invaluable asset for employment agencies and hiring managers who constantly search for qualified professionals to fill job openings. Data about people's interests, hobbies and shopping preferences are priceless for market research and target advertisement campaigns. Finally, any current information about people (e.g. current employment, contact information, etc) is of great interest to individuals who want to search for or reestablish contact with old friends, acquaintances or colleagues.

As organizations increase their Web presence through their own Web sites or press releases that are published on-line, most public information about organizations become accessible through the Web. Any type of organization information that a few years ago would only be published in brochures, news articles, trade show presentations, or direct mail to customers and consumers, now is also routinely published to the organization's Web site where it is readily accessible by anyone with an Internet connection and a Web browser. The information that organizations typically publish in their Web sites include the following:

Organization name
Organization description
Products
Management team
Contact information
Organization press releases
Product reviews, awards, etc
Organization location(s)
. . . etc . . .

SUMMARY OF THE INVENTION

Two types of information with great commercial value are information about people and information about organizations. The emergence of the Web as the primary communication medium has made it the world's largest repository of these two types of information. This presents unique opportunities but also unique challenges: generally, information in the Web is published in an unstructured form, not suitable for database-type queries. Search engines and data extraction tools have been developed to help users search and retrieve information from Web sources. However, all these tools need a basic front-end infrastructure, which will provide them with Web pages satisfying certain criteria. This infrastructure is generally based on software robots that crawl the Web visiting and traversing Web sites in search of the appropriate Web pages. The purpose of this invention is to describe such a software robot that is specialized in searching and retrieving Web pages that contain information about people or organizations. Techniques and algorithms are presented which make this robot efficient and accurate in its task.

The invention method for searching for people and organization information on Web pages, in a global computer network, comprises the steps of:

accessing a Web site of potential interest, the Web site having a plurality of Web pages, determining a subset of the plurality of Web pages to process, and for each Web page in the subset, (i) determining types of contents found on the Web page, and (ii) based on the determined content types, enabling extraction of people and organization information from the Web page.

Preferably the step of accessing includes obtaining domain name of the Web site, and the step of determining content types includes collecting external links and other domain names. Further, the step of obtaining domain names includes receiving the collected external links and other domain names from the step of determining content types.

In the preferred embodiment, the step of determining the subset of Web pages to process includes processing a listing of internal links and selecting from remaining internal links as a function of keywords. The step of determining a subset of Web pages to process includes: extracting from a script a quoted phrase ending in ".ASP", ".HTM" or ".HTML"; and treating the extracted phrase as an internal link.

In addition, the step of determining the subset of Web pages to process includes determining if a subject Web page contains a listing of press releases or news articles, and if so, following each internal link in the listing of press releases/news articles.

In accordance with one aspect of the present invention, the step of accessing includes determining whether the Web site has previously been accessed for searching for people and organization information. In determining whether the Web site has previously been accessed, the invention includes obtaining a unique identifier for the Web site; and comparing the unique identifier to identifiers of past accessed Web sites to determine duplication of accessing a same Web site. The step of obtaining a unique identifier may further include forming a signature as a function of home page of the Web site.

Another aspect of the present invention provides time limits or similar respective thresholds for processing a Web site and a Web page, respectively.

In addition, the present invention maintains a domain database storing, for each Web site, indications of:

Web site domain name;

name of content owner;

site type of the Web site;

frequency at which to access the Web site for processing;

date of last accessing and processing;

outcome of last processing;

number of Web pages processed; and number of data items found in last processing.

Thus a computer system for carrying out the foregoing invention method includes a domain database as mentioned above and processing means (e.g., a crawler) coupled to the database as described in detail below.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is a flowchart of the function that examines and processes newly found links during crawling.

DETAILED DESCRIPTION OF THE INVENTION

The present invention is a software program that systematically and automatically visits Web sites and examines Web pages with the goal of identifying potentially interesting sources of information about people and organizations. This process is often referred to as "crawling" and thus the terms "Crawler" or "software robot" will both be used in the next sections to refer to the invention software program.

Figure 1:
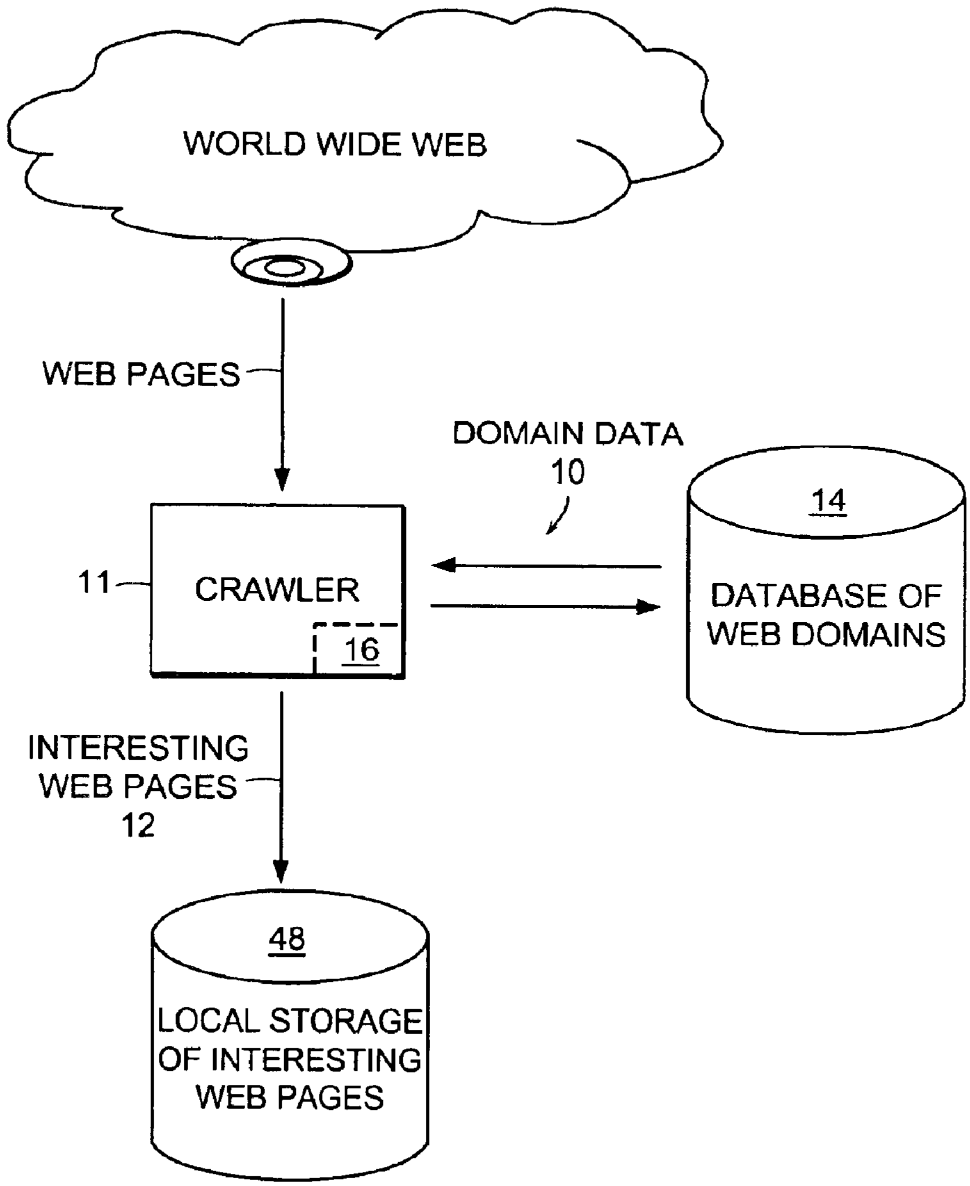
FIG. 1 is a block diagram illustrating the main components of a system embodying the present invention and the data flow between them.

As illustrated in FIG. 1, the input to the Crawler 11 is the domain 10 (URL address) of a Web site. The main output of Crawler 11 is a set of Web pages 12 that have been tagged according to the type of information they contain (e.g. "Press release", "Contact info", "Management team info+Contact info", etc). This output is then passed to other components of the system (i.e. data extractor) for further processing and information extraction. In addition to the Web pages 12, the Crawler 11 also collects/extracts a variety of other data, including the type of the Web site visited, the organization name that the site belongs to, keywords that describe that organization, etc. This extracted data is stored in a Web domain database 14.

Figure 2:
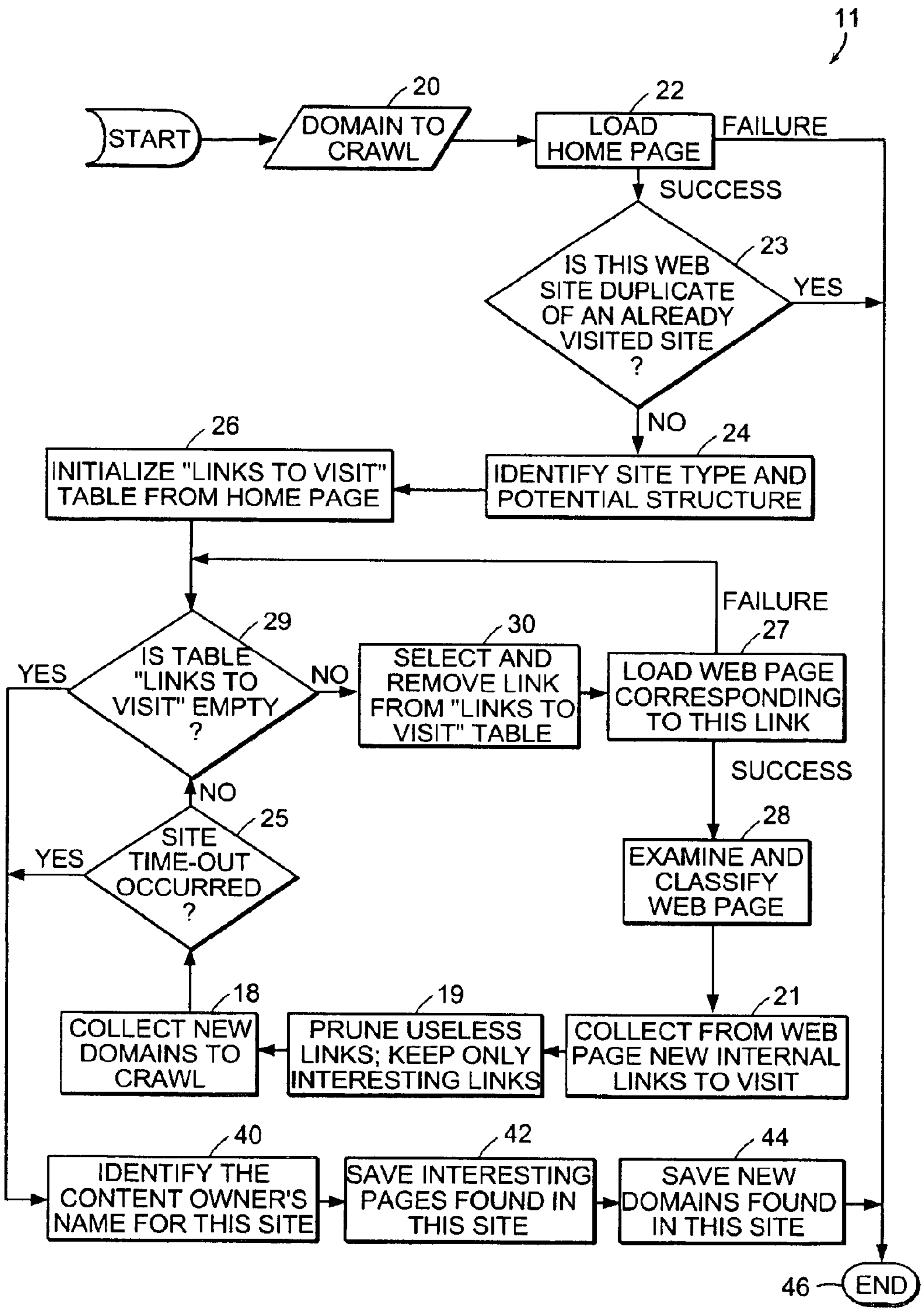
FIG. 2 is a flowchart of the crawling process employed by the invention system of FIG. 1.

A high level description of the Crawler's 11 functionality and how it is used with a data-extraction system is as follows and illustrated in FIG. 2:

a) A database 14 is provided to the system with a list of domains and associated information for each domain (e.g. date of last visit by the Crawler 11, crawling frequency, etc).

b) The system starts a number of Crawlers 11 that crawl in parallel different domains, or different parts of a given domain.

c) As illustrated at step 20, each Crawler 11 picks an "available" domain from the database 14 and starts crawling it (a domain is "available" if none of the other Crawlers 11 is processing it at the time). All the domains that have been currently assigned to some Crawler 11 are marked as "unavailable".

d) The Crawler 11 visits pages in the given domain by starting from the root (home) page and follows recursively the links it finds if the links belong to the current domain as illustrated by the loop of steps 29, 30, 27, 28, 21, 19, 18 and 25 in FIG. 2.

In the preferred embodiment, the Crawler 11 first loads the home page (step 22) and determines whether the corresponding Web site is a duplicate of a previously processed site (step 23), detailed later. If the Crawler 11 is unsuccessful at loading the home page or if the site is determined to be a duplicate, then Crawler processing ends 46. If the Web site is determined to be non-duplicative, then Crawler 11 identifies the site type and therefrom the potential or probable structure of the contents at that site (step 24).

Next Crawler 11 initializes 26 a working table 16 (FIG. 1) held in Crawler memory and referred to as the "links to visit" table 16 further detailed in FIG. 3. At step 30 (FIG. 2), Crawler 11 selects and processes internal links (i.e., links belonging to the current domain), one at a time, from this table 16. To process a link, Crawler 11 (i) loads 27 the Web page corresponding to the link, (ii) examines and classifies 28 the Web page, (iii) collects 21 from the Web page and prunes 19 new internal links to process, and (iv) collects 18 new domains/URL addresses of other Web sites to crawl. The step of collecting 21 new internal links and updating table 16 therewith is further described below in FIG. 3.

e) With regard to step 28, the Crawler 11 examines each Web page it visits and decides if it contains interesting information or not. For each page that contains interesting information, the Crawler 11 assigns a type to it that denotes the type of information the subject Web page contains, and then it saves (step 42) the page in a storage medium 48 as detailed below. The Crawler 11 maintains a table in internal crawler memory and stores in the table (i) the links for all the interesting pages it finds, (ii) the location of the saved pages in the storage medium 48, and (iii) an indication of type of data each interesting page contains.

f) Finally, in the preferred embodiment, after a predefined period of time for processing the Web site expires 25, Crawler 11 determines the content owner's name for the site (step 40) and saves the determined name in domain database 14. Further the Crawler 11 saves interesting pages found at this site (step 42) in data store 48 (FIG. 1). The Crawler 11 saves (step 44) in the domain database 14 the off-site links it finds as potential future crawling starting points.

Accordingly, the invention system must maintain and grow a comprehensive database 14 of domain URLs with additional information about each domain. This information includes:

Domain URL

Name of owner of the URL as identified from the Web site (organization name)

Type of Web site

Visiting frequency

Date of last visit

Outcome of last visit (successful, or timed-out)

Size of domain (i.e., number of Web pages)

Number of data items found in last visit

This database 14 is used by the Crawler 11 in selecting the domain to visit next, and it is also updated by the Crawler 11 after every crawl session as described above in steps 40 and 44 of FIG. 2. Note every domain is associated with some "visiting frequency". This frequency is determined by how often the domain is expected to significantly change its content, e.g. for news sites the visiting frequency may be "daily", for conference sites "weekly", whereas for companies "monthly" or "quarterly".

As mentioned above, in step 40 of FIG. 2, one important task that the Crawler 11 performs is to identify the content owner name of every Web site that it visits. Knowing the content owner name is an important piece of information for several reasons:

a) it enables better data extraction from the Web site, since it provides a useful meta-understanding of text found in the site. For example, if the Crawler 11 identifies the site's owner name as "ABC Corporation", then a list of people found in a paragraph headed "Management Team" can be safely assumed to be employees of "ABC Corporation".

b) it facilitates algorithms for resolving duplicate sites (see below).

c) it creates automatically a list of domain URLs with corresponding owner name, which is of high business value.

In order to identify the content owner name of a Web site, the current invention uses a system based on Bayesian Networks described in section 1 of the related U.S. Provisional Application No. 60/221,750.

As noted at step 23 in FIG. 2, a problem that the Crawler 11 faces is to be able to resolve duplicate sites. Duplicate sites appear when an organization uses two or more completely different domain URLs that point to the same site content (same Web pages).

One way to address this problem is by creating and storing a "signature" for each site and then compare signatures. A signature can be as simple as a number or as complex as the whole site structure. Another way to address the problem is to completely ignore it and simply recrawl the duplicate site. But this would result in finding and extracting duplicate information which may or may not pose a serious problem.

If comparing signatures is warranted, then certain requirements must be met:

signatures must be fairly unique, i.e. the probability of two different Web sites having the same signature must be very low signatures must be easy and efficient to compare signatures must be easy to generate by visiting only a few of the site's pages, i.e. a signature that requires the Crawler to crawl the whole site in order to generate it would defeat its purpose.

There are many different techniques that can be used to create site signatures. In the simplest case, the organization name as it is identified by the Crawler could be used as the site's signature. However, as the Web brings together organizations from all geographic localities, the probability of having two different organizations with the same name is not negligible. In addition, in order to identify the organization name the Crawler has to crawl at least two levels deep into the Web site.

Ideally, a signature should be created by only processing the home page of a Web site. After all, a human needs to look only at the home page to decide if two links point to the same site or to different sites. Three techniques that only examine the home page are outlined next.

Every Web page has some structure at its text level, e.g. paragraphs, empty lines, etc. A signature for a page may be formed by taking the first letter of every paragraph and a space for every empty line, and putting them in a row to create a string. This string can be appended then to the page's title, to result in a text "signature". This text signature may finally be transformed into a number by a hash function, or used as it is.

Another way to create a text signature is to put the names of all pages that are referenced in the home page in a row creating a long string (e.g. if the page has links: news/basket/todayscore.html, contact/address.html, contact/directions/map.html, . . . the string would be: "todayscore_address_map_. . . "). To make the string shorter, only the first few letters of each link may be used (e.g. by using the first two letters, the above example would produce the string "toadma. . . "). The page title may also be appended, and finally the string can either be used as it is, or transformed into a number by a hash function.

An alternative way to create a signature is to scan the home page and create a list of the items the page contains (e.g. text, image, frame, image, text, link, text, . . . ). This list can then be encoded in some convenient fashion, and be stored as a text string or number. Finally, one element of the home page that is likely to provide a unique signature in many cases is its title. Usually the title (if it exists) is a whole sentence which very often contains some part of the organization name, therefore making it unique for organization sites. The uniqueness of this signature can be improved by appending to the title some other simple metric derived from the home page, e.g. the number of paragraphs in the page, or the number of images, or the number of external links, etc.

Signature comparison can either be performed by directly comparing (i.e., pattern/character matching) signatures looking for a match, or, if the signatures are stored as text strings, then a more flexible approximate string matching can be performed. This is necessary because Web sites often make small modifications to their Web pages that could result in a different signature. The signature comparison scheme that is employed should be robust enough to accommodate small Web site changes. Approximate string matching algorithms that result in a matching "score" may be used for this purpose.

As described at steps 18 and 21 in FIG. 2, as the Crawler 11 traverses the Web site, it collects and examines the links it finds on a Web page. If a link is external (it points to another Web site) then Crawler 11 saves the external domain URL in the domain database 14 as a potential future crawling point. If a link is internal (points to a page in the current Web site) then the Crawler 11 examines the link text and URL for possible inclusion into the table 16 list of "links to visit". Note that when the Crawler 11 starts crawling a Web site, it only has one link, which points to the site's home page. In order to traverse the site though it needs the links to all pages of the site. Therefore it is important to collect internal links as it crawls through the site and stores the collected links in the "links to visit" table 16 as illustrated in FIG. 3.

When an internal link is found in a Web page, the Crawler 11 uses the following algorithm to update the "links to visit" table 16:

```
IF (newLink.URL already exists in "links to visit" table) THEN
    SET tableLink = link from "links to visit" table that matches the URL
    IF (newLink.text is not contained in tableLink.text) THEN
        SET tableLink.text = tableLink.text + newLink.text
    ENDIF
ELSE
    add newLink to "links to visit" table
ENDIF
```

FIG. 3 is a flow chart of this algorithm/(process) 58. The process 58 begins 32 with an internal link (i.e., newlink.URL and newlink.text) found on a subject Web page. The foregoing first IF statement is asked at decision junction 34 to determine whether newlink.URL for this internal link already exists in table 16. If so, then step 36 finds the corresponding table entry and step 38 subsequently retrieves or otherwise obtains the respective text (tablelink.text) from the table entry. Next decision junction 52 asks the second IF statement in the above algorithm to determine whether the subject newlink.text is contained in the table entry text tablelink.text. If so, then the process 58 ends 56. Otherwise the process 58 appends (step 54) newlink.text to tablelink.text and ends 56.

If decision junction 34 (the first IF statement) results in a negative finding (i.e., the subject newlink.URL is not already in table 16), then step 50 adds the subject internal link (i.e., newlink.URL and newlink.text) to table 16. This corresponds to the ELSE statement of the foregoing algorithm for updating table 16, and process 58 ends at 56 in FIG. 3.

A special case of collecting links from a Web page is when the page contains script code. In those cases, it is not straightforward to extract the links from the script. One approach would be to create and include in the Crawler 11 parsers for every possible script language. However, this would require a substantial development and maintenance effort, since there are many Web scripting languages, some of them quite complex. A simpler approach though that this invention implements is to extract from the script anything that looks like a URL, without the need to understand or parse "correctly" the script. The steps that are used in this approach are the following:

a) Extract from the script all tokens that are enclosed in quotes (single or double quotes)

b) Discard tokens that contain any whitespace characters (i.e. spaces, tabs, newlines, carriage returns)

c) Discard tokens that do not end in one of the following postfixes: .html, .htm, .asp As an example, consider the following script code:

menu=new NavBarMenu(123, 150);
menu.addItem(new MenuItem("<center>Orders</center>", ""));
menu.addItem(new MenuItem("Online Orders", "how_to_buy/online_orders.asp"));
menu.addItem(new MenuItem("Phone Orders", "how_to_buy/phone_orders.asp"));
menu.addItem(new MenuItem("Retail Stores", "how_to_buy/retailers. html"));

From this code, step (a) produces the following tokens:

"<center>Orders</center>"
""
"Online Orders"
"how_to_buy/online_orders.asp"
"Phone Orders"
"how_to_buy/phone orders.asp"
"Retail Stores"
"how_to_buy/retailers.html"

Step (b) reduces these tokens to the following:

"<center>Orders</center>"
""
"how_to_buy/online_orders.asp"
"how_to_buy/phone_orders.asp"
"how_to_buy/retailers.html"

Finally, step (c) concludes to the following tokens:

"how_to_buy/online_orders.asp"
"how_to_buy/phone_orders.asp"
"how_to_buy/retailers.html"

Turn now to the pruning step 19 of FIG. 2. The number of Web pages that a Web site may contain varies dramatically. It can be anywhere from only one home page with some contact information, to hundreds or thousands of pages generated dynamically according to user interaction with the site. For example a larger retailer site may generate pages dynamically from its database of products that it carries. It is not efficient and sometimes not feasible for the Crawler 11 to visit every page of every site it crawls, therefore a "pruning" technique is implemented which prunes out links that are deemed to be useless. The term "pruning" is used because the structure of a Web site looks like an inverted tree: the root is the home page, which leads to other pages in the first level (branches), each one leading to more pages (more branches out of each branch), etc. If a branch is considered "useless", it is "pruned" along with its "children" or branches that emanate from it. In other words the Crawler 11 does not visit the page or the links that exist on that Web page.

The pruning is preferably implemented as one of the following two opposite strategies:

a) the Crawler 11 decides which links to ignore and follows the rest;

b) the Crawler 11 selects which links to follow and ignores the rest.

Different sites require different strategies. Sometimes, even within a site different parts are better suited for one or the other strategy. For example, in the first level of news sites the Crawler 11 decides which branches to ignore and follows the rest (e.g. it ignores archives but follows everything else) whereas in news categories it decides to follow certain branches that yield lots of people names and ignores the rest (e.g. it follows the "Business News" section but ignores the "Bizarre News" section).

A sample of the rules that the Crawler 11 uses to decide which links to follow and which to ignore is the following:

Follow all links that are contained in the home page of a site.

Follow all links that the referring text is a name.

Follow all links that the referring text contains a keyword that denotes "group of people" (e.g. "team", "group", "family", "friends", etc.).

Follow all links that the referring text contains a keyword that denotes an organizational section (e.g. "division", "department", "section", etc).

Follow all links that the referring text contains a keyword that denotes contact information (e.g. "contact", "find", etc.)

. . . etc. . . .

Ignore links that lead to non-textual entities (e.g. image files, audio files, etc.)

Ignore links that lead to a section of the current page (i.e. bookmark links)

Ignore links that lead to pages already visited

Ignore links that result from an automated query (e.g. search engine results)

. . . etc. . . .

One of the most significant tasks for the Crawler 11 is to identify the type of every interesting page it finds as in step 28 of FIG. 2. In the preferred embodiment, the Crawler 11 classifies the pages into one of the following categories:

Organization Sites

Management team pages (info about the management team)

Biographical pages

Press release pages

Contact info pages

Organization description pages

Product/services pages

Job opening pages

. . . etc.

News and information Sites

Articles/news with information about people

Articles/news with information about companies/institutions

Job opening ads

. . . etc.

Schools, universities, colleges Sites

Personnel pages (information about faculty/administrators)

Student pages (names and information about students)

Curriculum pages (courses offered)

Research pages (info about research projects)

Degree pages (degrees and majors offered)

Contact info pages

Description pages (description of the institution, department, etc)

. . . etc.

Government organizations Sites (federal, state, etc)

Description pages

Department/division pages

Employee roster pages

Contact info pages

. . . etc.

Medical, health care institutions Sites

Description pages

Department/specialties pages

Doctor roster pages

Contact info pages

. . . etc.

Conferences, workshops, etc

Description pages

Program/schedule pages

Attendees pages

Presenters pages

Organizing committee pages

Call for papers pages

Contact info pages

. . . etc.

Organizations and associations Sites

Description pages

Members pages

Contact info pages

. . . etc.

In order to find the type of every Web page, the Crawler 11 uses several techniques. The first technique is to examine the text in the referring link that points to the current page. A list of keywords is used to identify a potential page type (e.g. if the referring text contains the word "contact" then the page is probably a contact info page; if it contains the word "jobs" then it is probably a page with job opportunities; etc.)

The second technique is to examine the title of the page, if there is any. Again, a list of keywords is used to identify a potential page type.

The third technique is to examine directly the contents of the pages. The Crawler 11 maintains several lists of keywords, each list pertaining to one page type. The Crawler 11 scans the page contents searching for matches from the keyword lists; the list that yields the most matches indicates a potential page type. Using keyword lists is the simplest way to examine the page contents; more sophisticated techniques may also be used, for example, Neural Networks pattern matching, or Bayesian classification (for example, see Invention 3 as disclosed in the related Provisional Application No. 60/221,750 filed on Jul. 31, 2000 for a "Computer Database Method and Apparatus"). In any case, the outcome is one or more candidate page types.

After applying the above techniques the Crawler 11 has a list of potential content (Web page) types, each one possibly associated with a confidence level score. The Crawler 11 at this point may use other "site-level" information to adjust this score; for example, if one of the potential content/page types was identified as "Job opportunities" but the Crawler 11 had already found another "Job opportunities" page in the same site with highest confidence level score, then it may reduce the confidence level for this choice.

Finally, the Crawler 11 selects and assigns to the page the type(s) with the highest confidence level score.

Correctly identifying the Web site type is important in achieving efficiency while maintaining a high level of coverage, namely, not missing important pages, and accuracy, identifying correct information about people. Different types of sites require different frequency of crawling. For example, a corporation Web site is unlikely to change daily, therefore it is sufficient to re-crawl it every two of three months without considerable risk of losing information, saving on crawling and computing time. On the other hand, a daily newspaper site completely changes its Web page content every day and thus it is important to crawl that site daily.

Different Web site types also require different crawling and extraction strategies. For example a Web site that belongs to a corporation is likely to yield information about people in certain sections, such as: management team, testimonials, press releases, etc. whereas this information is unlikely to appear in other parts, such as: products, services, technical help, etc. This knowledge can dramatically cut down on crawling time by pruning these links, which in many cases are actually the most voluminous portions of the site, containing the major bulk of Web pages and information.

Certain types of Web sites, mainly news sites, associations, and organizations, include information about two very distinct groups of people, those who work for the organization (the news site, the association or the organization) and those who are mentioned in the site, such as people mentioned or quoted in the news produced by the site or a list of members of the association. The Crawler 11 has to identify which portion of the site it is looking at so as to properly direct any data extraction tools about what to expect, namely a list of people who work for the organization or an eclectic and "random" sample of people. This knowledge also increases the efficiency of crawling since the news portion of the news site has to be crawled daily while the staff portion of the site can be visited every two or three months.

There are several ways to identify the type of a Web site and the present invention uses a mixture of these strategies to ultimately identify and tag all domains in its database. At the simplest case, the domain itself reveals the site type, i.e. domains ending with ".edu" belong to educational sites (universities, colleges, etc), whereas domains ending with ".mil" belong to military (government) sites. When this information is not sufficient, then the content owner name as identified by the Crawler can be used, e.g. if the name ends with "Hospital" then it's likely a hospital site, if the name ends with "Church" then it's likely a church site, etc. When these simple means cannot determine satisfactorily the site type, then more sophisticated tools can be used, e.g. a Bayesian Network as described in Invention 2 disclosed in the related Provisional Application No. 60/221,750 filed on Jul. 31, 2000 for a "Computer Database Method and Apparatus".

It is often useful to create a "map" of a site, i.e. identifying its structure (sections, links, etc). This map is useful for assigning higher priority for crawling the most significant sections first, and for aiding during pruning. It may also be useful in drawing overall conclusions about the site, e.g. "this is a very large site, so adjust the time-out periods accordingly". Finally, extracting and storing the site structure may be useful for detecting future changes to the site.

This map contains a table of links that are found in the site (at least in the first level), the page type that every link leads to, and some additional information about every page, e.g. how many links it contains, what percentage is the off-site links, etc.

The system works with a number of components arranged in a "pipeline" fashion. This means that output from one component flows as input to another component. The Crawler 11 is one of the first components in this pipeline; part of its output (i.e. the Web pages it identifies as interesting and some associated information for each page) goes directly to the data extraction tools.

The flow of data in this pipeline, however, and the order in which components are working may be configured in a number of different ways. In the simplest case, the Crawler 11 crawls completely a site, and when it finishes it passes the results to the Data Extractor which starts extracting data from the cached pages. However, there are sites in which crawling may take a long time without producing any significant results (in extreme cases, the Crawler 11 may be stuck indefinitely in a site which is composed of dynamically generated pages, but which contain no useful information). In other cases, a site may be experiencing temporary Web server problems, resulting in extremely long delays for the Crawler 11.

To help avoid situations like these and make the Crawler 11 component as productive as possible, there are two independent "time-out" mechanisms built into each Crawler. The first is a time-out associated with loading a single page (such as at 22 in FIG. 2). If a page cannot be loaded in, say, 30 seconds, then the Crawler 11 moves to another page and logs a "page time-out" event in its log for the failed page. If too many page time-out events happen for a particular site, then the Crawler 11 quits crawling the site and makes a "Retry later" note in the database 14. In this way it is avoided crawling sites that are temporarily unavailable or experience Internet connection problems.

The second time-out mechanism in the Crawler 11 refers to the time that it takes to crawl the whole site. If the Crawler 11 is spending too long crawling a particular site (say, more than one hour) then this is an indication that either the site is unusually large, or that the Crawler 11 is visiting some kind of dynamically created pages which usually do not contain any useful information for our system. If a "site time-out" event occurs (step 25 of FIG. 2), then the Crawler 11 interrupts crawling and it sends its output directly to Data Extractor, which tries to extract useful data. The data extraction tools report statistical results back to Crawler 11 (e.g. the amount of useful information they find) and then the Crawler 11 decides if it's worth to continue crawling the site or not. If not, then it moves to another site. If yes, then it resumes crawling the site (possibly from a different point than the one it had stopped, depending on what pages the data extractor deemed as rich in information content).

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for collecting people and organization information from Web sites in a global computer network comprising the steps of:

accessing a Web site of potential interest, the Web site having a plurality of Web pages;

determining a subset of the plurality of Web pages to process; and for each Web page in the subset, (i) determining types of contents found on the Web page, and (ii) based on the determined content types, enabling extraction of people and organization information from the Web page.

2. A method as claimed in claim 1 wherein the step of accessing includes determining whether the Web site has previously been accessed for searching for people and organization information.

3. A method as claimed in claim 2 wherein the step of determining whether the Web site has previously been accessed includes:

obtaining a unique identifier for the Web site; and comparing the unique identifier to identifiers of past accessed Web sites to determine duplication of accessing a same Web site.

4. A method as claimed in claim 3 wherein the step of obtaining a unique identifier includes forming a signature as a function of home page of the Web site.

5. A method as claimed in claim 1 wherein the step of determining the subset of Web pages to process includes processing a listing of internal links and selecting from remaining internal links as a function of keywords.

6. A method as claimed in claim 5 wherein the step of determining a subset of Web pages to process includes:

extracting from a script a quoted phrase ending in ".ASP", ".HTM" or ".HTML"; and treating the extracted phrase as an internal link.

7. A method as claimed in claim 1 wherein the step of determining content types of Web pages includes obtaining the content owner name of the Web site as a whole by using a Bayesian Network and appropriate tests.

8. A method as claimed in claim 1 wherein the step of determining content types of Web pages includes collecting external links that point to other domains and extracting new domain URLs which are added to a domain database.

9. A method as claimed in claim 1 wherein the step of determining the subset of Web pages to process includes determining if a subject Web page contains a listing of press releases, and if so, following each internal link in the listing of press releases.

10. A method as claimed in claim 1 wherein the step of determining the subset of Web pages to process includes determining if a subject Web page contains a listing of news articles, and if so, following each internal link in the listing of news articles.

11. A method as claimed in claim 1 further comprising imposing a time limit for processing a Web site.

12. A method as claimed in claim 1 further comprising imposing a time limit for processing a Web page.

13. A method as claimed in claim 1 further comprising the step of maintaining a domain database storing for each Web site indications of:

Web site domain URL;

name of content owner;

site type of the Web site;

frequency at which to access the Web site for processing;

date of last accessing and processing;

outcome of last processing;

number of Web pages processed; and number of data items found in last processing.

14. Apparatus for collecting people and organization information from Web sites in a global computer network comprising:

a domain database storing respective domain names of Web sites of potential interest; and computer processing means coupled to the domain database, the computer processing means:

(a) obtaining from the domain database, domain name of a Web site of potential interest and accessing the Web site, the Web site having a plurality of Web pages;

(b) determining a subset of the plurality of Web pages to process; and (c) for each Web page in the subset, the computer processing means (i) determining types of contents found on the Web page, and (ii) based on the determined content types, enabling extraction of people and organization information from the Web page.

15. Apparatus as claimed in claim 14 wherein the computer processing means accessing the Web site includes determining whether the Web site has previously been accessed for searching for people and organization information.

16. Apparatus as claimed in claim 15 wherein the computer processing means determining whether the Web site has previously been accessed includes:

obtaining a unique identifier for the Web site; and comparing the unique identifier to identifiers of past accessed Web sites to determine duplication of accessing a same Web site.

17. Apparatus as claimed in claim 16 wherein the computer processing means obtaining a unique identifier includes forming a signature as a function of home page of the Web site.

18. Apparatus as claimed in claim 14 wherein the computer processing means determining the subset of Web pages to process includes processing a listing of internal links and selecting from remaining internal links as a function of keywords.

19. Apparatus as claimed in claim 18 wherein the computer processing means determining a subset of Web pages to process includes:

extracting from a script a quoted phrase ending in ".ASP", ".HTM" or ".HTML"; and treating the extracted phrase as an internal link.

20. Apparatus as claimed in claim 14 wherein the computer processing means determining content types of Web pages includes collecting external links and other domain names, and the step of obtaining domain names includes receiving the collected external links and other domain names from the step of determining content types.

21. Apparatus as claimed in claim 14 wherein the computer processing means determining the subset of Web pages to process includes determining if a subject Web page contains a listing of press releases, and if so, following each internal link in the listing of press releases.

22. Apparatus as claimed in claim 14 wherein the computer processing means determining the subset of Web pages to process includes determining if a subject Web page contains a listing of news articles, and if so, following each internal link in the listing of news articles.

23. Apparatus as claimed in claim 14 further comprising a time limit by which the computer processing means processes a Web site.

24. Apparatus as claimed in claim 14 further comprising a time limit by which the computer processing means processes a Web page.

25. Apparatus as claimed in claim 14 wherein the domain database further stores for each Web site indications of:

name of content owner, site type of the Web site, frequency at which to access the Web site for processing, date of last accessing and processing, outcome of last processing, number of Web pages processed, and number of data items found in last processing.

* * * * *